(12) United States Patent
Lu et al.

(10) Patent No.: US 6,191,787 B1
(45) Date of Patent: *Feb. 20, 2001

(54) INTERACTIVELY CONSTRUCTING, EDITING, RENDERING AND MANIPULATING GEOSCIENCE MODELS

(75) Inventors: Hong-Qian Lu; Christoph C. Ramshorn, both of Austin, TX (US)

(73) Assignee: Schlumberger Technology Corporation, Austin, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/021,220

(22) Filed: Feb. 10, 1998

(51) Int. Cl.[7] .................................................. G06F 15/00
(52) U.S. Cl. ............................................................ 345/418
(58) Field of Search .................................... 345/418, 419, 345/426, 433, 117, 121, 427, 428, 429, 430

(56) References Cited

U.S. PATENT DOCUMENTS

| | | | |
|---|---|---|---|
| 4,340,934 | 7/1982 | Segesman | 364/422 |
| 4,679,174 | 7/1987 | Gelfand | 367/73 |
| 4,969,130 | 11/1990 | Wason et al. | 367/73 |
| 4,991,095 | 2/1991 | Swanson | 364/421 |
| 5,214,613 | 5/1993 | Esmersoy | 367/31 |
| 5,229,976 | 7/1993 | Boyd et al. | 367/73 |
| 5,309,360 | 5/1994 | Monk et al. | 364/420 |
| 5,394,325 | 2/1995 | Schneider, Jr. | 364/421 |
| 5,583,825 | 12/1996 | Carrazzone et al. | 367/31 |
| 5,648,937 | 7/1997 | Campbell | 367/27 |
| 5,949,424 | * 9/1999 | Cabral et al. | 345/426 |

FOREIGN PATENT DOCUMENTS

| | | |
|---|---|---|
| 0 299 862 A2 | 1/1987 | (EP) . |
| 0 745 870 A2 | 12/1996 | (EP) . |
| 2300736 | 11/1996 | (GB) . |
| 2309562 | 7/1997 | (GB) . |
| WO 97/38330 | 10/1997 | (WO) . |
| PCT/US97/24278 | 5/1998 | (WO) . |
| PCT/US97/24279 | 6/1998 | (WO) . |

OTHER PUBLICATIONS

Bode, T. et al. "First experiences with GEOSTORE, an information system for geologically defined geometries" IGIS '94: Geographic Information Systems, International Workshop on Advanced Research In Geographic Information Systems. ISBN 3–540–58795–0, 1994, Berlin, Springer–Verlag, Germany, pp. 35–44, XP002064462.

(List continued on next page.)

*Primary Examiner*—Phu K. Nguyen
(74) *Attorney, Agent, or Firm*—Howard L. Speight; Pehr B. Jansson

(57) ABSTRACT

A method, computer system or computer program for interactively constructing, editing, rendering and manipulating geoscience models including aggregating the functionality of a geometry system and a graphics system, enforcing consistency between the geometry system and the graphics system, and interfacing the geometry system and the graphics system to an application through an integration layer.

100 Claims, 14 Drawing Sheets

OTHER PUBLICATIONS

Jones, C.B. "Data structures for three–dimensional spatial information systems in geology," International Journal of Geographical Information Systems, Jan.–Mar. 1989, UK, vol. 3, No. 1, ISSN 0269–3798, pp. 15–31, XP002064461.

Raafat, Hazem M. "An extended relational database for remotely sensed image data management within GIS," IEEE Transactions on Geoscience and Remote Sensing, vol. 29, No. 4, Jul. 1991, New York, pp. 651–655, XP000258538.

Jesperson, S.K., et al., "Modeling of Received Signals from Interfaces of Arbitrary Geometry", *1995 IEEE Ultrasonics Symposium*, published Jul. 11, 1995, pp. 1561–1565.

Kobbelt L. et al, "Interactive Multi–Resolution Modeling on Arbitrary Meshes", Proceedings of SIGGRAPH'98,1998.

Lu K., "Common Model Builder—A Toolkit for Multidisciplinary Geoscience Modeling Applications", GOCAD ENSG Conference, 3D Modeling of Natural Objects: A Challenge for the 2000's,Jun. 4 & 5,1998.

Pajarola R. et al, "Large Scale Terrain Visualization Using The Restricted Quadtree Triangulation", Visualization 1998, pp. 1–9.

Shewchuk J., Triangle:Engineering a 2D Quality Mesh Generator and Delaunay Triangulatior, http://www.cs.smu.edu.afs.cs.project.quake/public/www/triangle,html, 1998.

Welch G. et al, "An Introduction to the Kalman Filter", http://www.cs.unc.edu/~welch/kalman/kalman.html, 1998.

Real Time Graphics for Visual Simulation: Advanced Techniques from the Top Down, SIGGRAPH 1998 Course Notes, 1998.

Assa, S. et al, "Feature–Based Geometric Modeling for Geoscience", GOCAD ENSG Conference, 3D Modeling of Natural Objects: A Challenge for the 200's, Jun. 4 & 5, 1998.

Cho, W. et al, "Topologically reliable approximation of composite Bezier Curves", Computer Aided Geometric Design, vol. 13, 1996, pp. 497–520.

De Floriani, L. et al, "Hierarchical Triangulation for Multiresolution Surface Description", ACM Transactions on Graphics, vol. 14, No. 4, Oct. 1995, pp. 363–411.

DeRose, T. et al, "Subdivision Surfaces in Character Animation", SIGGRAPH'98, Pixar Animation Studios, 1998.

Eck M. et al, "Multiresolution Analysis of Arbitrary Meshes", Proceedings of SIGGRAPH'95, 1995, pp. 173–182.

Garland M. et al, "Surface Simplification Using Quadric Error Metrics", Proceedings of SIGGRAPH'97, 1997.

Gumhold S. et al, "Real Time Compression of Triangle Mesh Connectivity", SIGGRAPH'98, 1998.

Gumhold S. et al, "Compression of Discrete Multiresolution Models", URL:http://www.gris.uni–tuebingen.de/~sgumhold, 1998.

Heller, M. "Triangulation Algorithms For Adaptive Terrain Modeling", Proceedings of 4th International Symposium on Spatial Data Handling, 1990,pp. 163–173.

Herzen B. et al, "Accurate Triangulations of Deformed, Intersecting Surfaces", Computer Graphics, vol. 21, No. 4, Jul. 1987, pp. 103–110.

Hoppe, Hugues, "Progressive Meshes", SIGGRAPH'96, 1996.

Ing D., "Spatial Modeling by Delaunay Networks of Two and Three Dimensions", http://www.iko.unit.no/tmp/term/term.html, Feb. 1993.

* cited by examiner

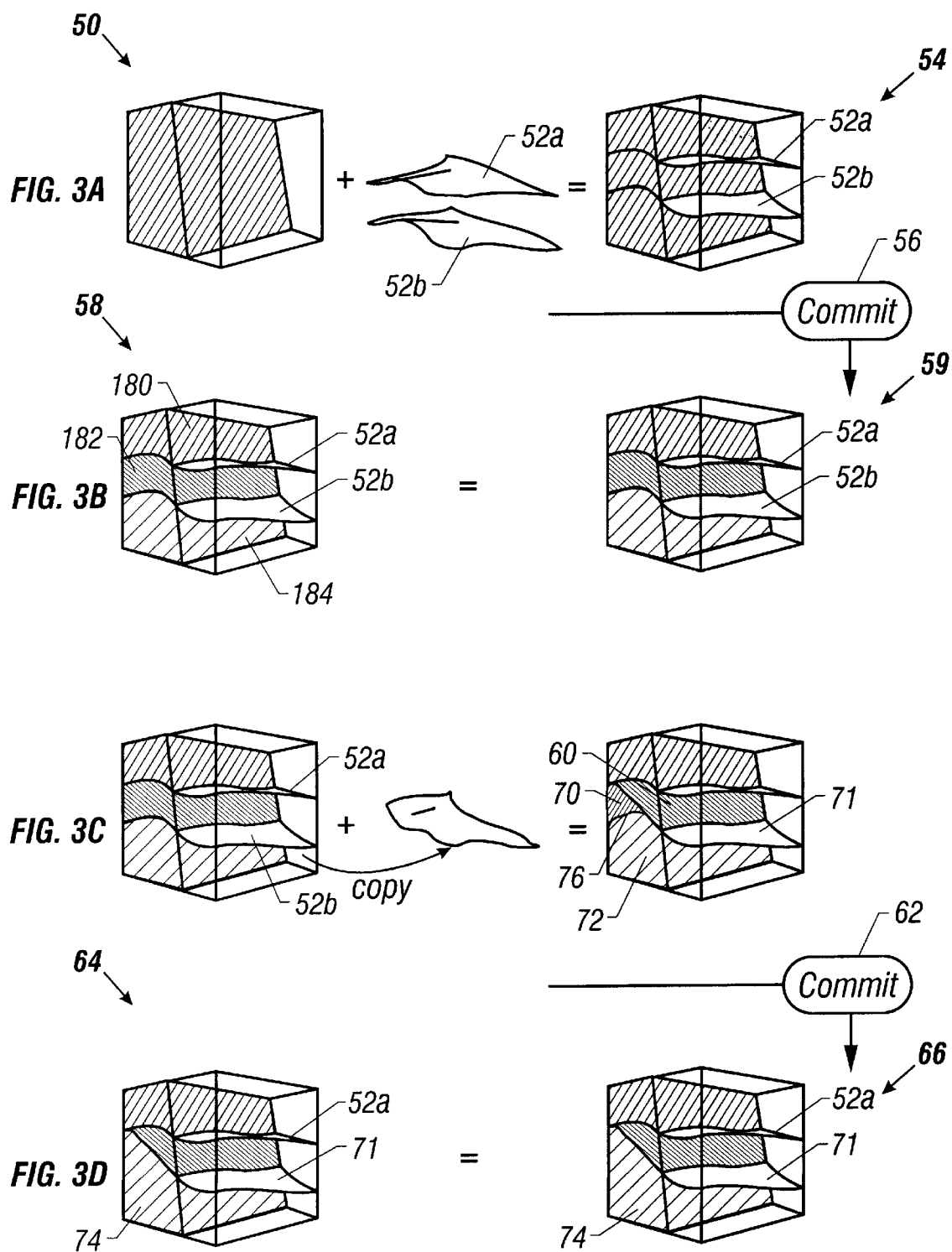

INTERACTIVELY CONSTRUCTING, EDITING, RENDERING AND MANIPULATING GEOSCIENCE MODELS

BACKGROUND

This application relates to interactively constructing, editing, rendering and manipulating geoscience models.

Geologists, geophysicists and petroleum engineers use models, including computerized models, of the earth's shell to plan exploration and production of hydrocarbons and, to a lesser extent, other minerals. As hydrocarbons become more and more scarce, the accuracy of the computerized models becomes increasingly important to limiting the cost of locating and producing hydrocarbons and the associated cost of hydrocarbon products, such as gasoline and heating oil.

Interpretation of geophysical and geological data stored in a computerized model relies on the ability of the model to be displayed in such a way that the information contained in the model can be discerned and edited.

SUMMARY

In general, in one aspect, the invention features a method, computer system or computer program for interactively constructing, editing, rendering and manipulating geoscience models including aggregating the functionality of a geometry system and a graphics system.

Implementations of the invention may include one or more of the following. The method may include providing the functionality of the geometry system by a geometry hierarchy of classes; and providing the functionality of the graphics system by a graphics hierarchy of classes. Aggregating may include providing the functionality of an aggregate hierarchy of classes, the aggregate hierarchy of classes connecting to the geometry hierarchy of classes and to the graphics hierarchy of classes. The geometry system may be separate from the graphics system. Aggregating may include providing the functionality of two or more objects.

The method may further include providing an interface to the aggregated geometry system and graphics system. The method may further include customizing the interface. The method may further include extending the interface.

The geometry system may use a first internal representation for an object's geometry and the graphics system may use a second internal representations for the object's geometry. The first internal representation for the object's geometry may be different than the second internal representation for the object's geometry. The geometry system may use a first internal representation for a property of an object and the graphics system may use a second internal representation for the property of the object. The first internal representation for the property of the object geometry may be different than the second internal representation for the property of the object.

The method may include making a temporal change to the geometry system's representation of the object's geometry or to the graphic system's representation of the object's geometry; making permanent the temporal change when the temporal change is committed; and detecting an inconsistency between the geometry system's representation of the object's geometry and the graphic system's representation of the object's geometry. The method may include resolving the inconsistency.

The geometry system's representation of the object's geometry may be empty. The object may include text. The object may include a three-dimensional symbol. Aggregating may include representing non-manifold geometries.

The method may include classifying a surface into a volume. Aggregating may include distributing the functionality of the geometry system and the functionality of the graphics system. Distributing may include executing the functionality of the geometry system on a first processor; and executing the functionality of the graphics system on a second processor.

The method may include providing mapping between a property in the geometry system and a renderable attribute in the graphics system. Providing the functionality of the geometry system may include providing an editing capability. The editing capability may localize an edit.

An object, not a part of the geometry system, may be part of the graphics system.

In general, in another aspect, the invention features a method, computer system and computer program for interactively constructing, editing, rendering and manipulating geoscience models including enforcing consistency between a geometry system and a graphics system.

Implementations of the invention may include one or more of the following. Enforcing consistency may include allowing inconsistency when an application makes a change to one of the systems. Enforcing consistency may include resolving the inconsistency when the application commits to the change.

In general, in another aspect, the invention features a method, computer system and computer program for interactively constructing, editing, rendering and manipulating geoscience models including interfacing a geometry system and a graphics system to an application through an integration layer.

Implementations of the invention may include one or more of the following. The method may include selectively bypassing the integration layer. The integration layer may not completely encapsulate the geometry system and the graphics system. Enforcing consistency may include allowing inconsistency when an application initiates a change to both of the systems and one of the systems is faster at making the change than the other system. The method may include resolving the inconsistency when the other system completes the change.

DESCRIPTION

Figure 4A:
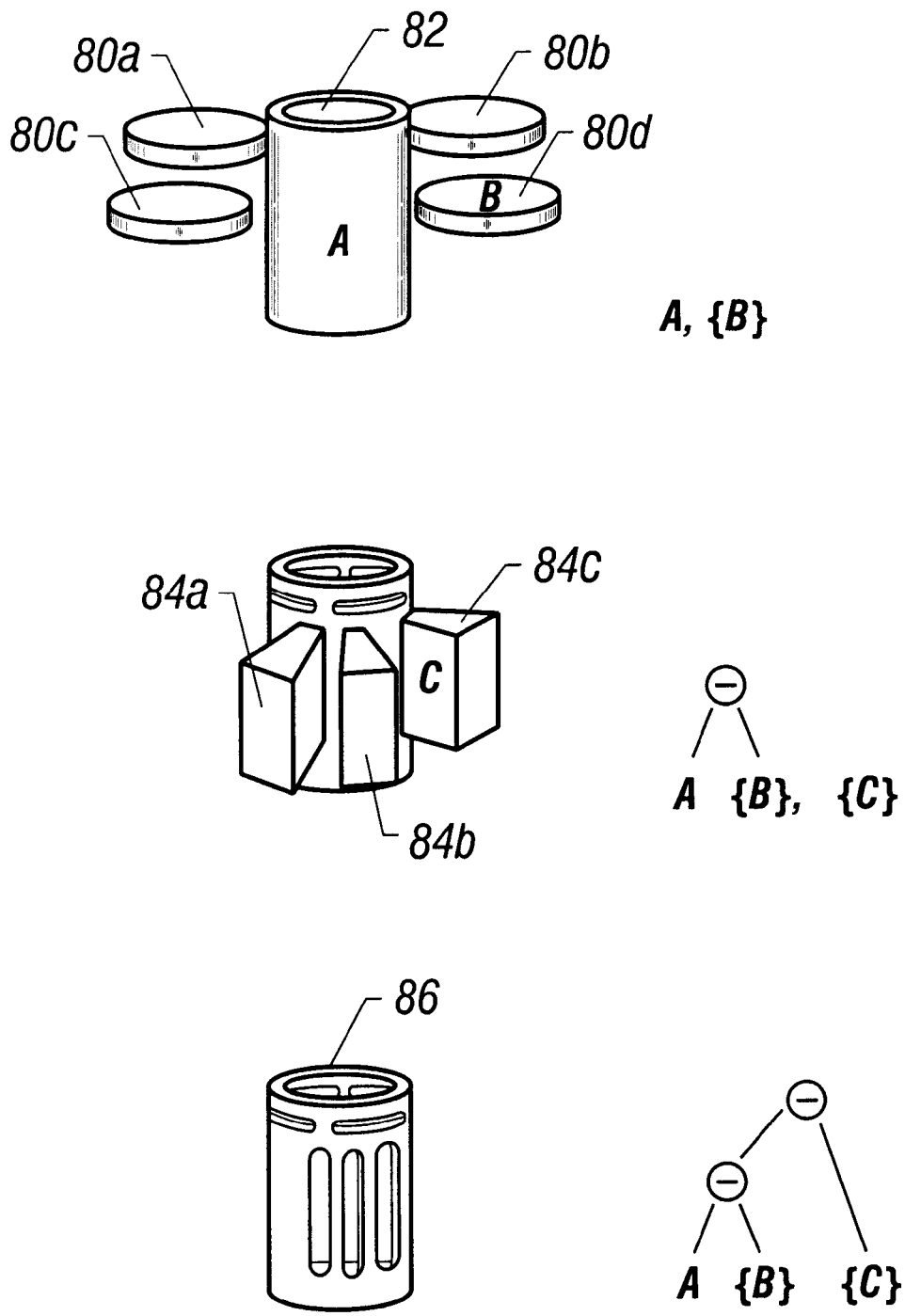
Figure 4B:
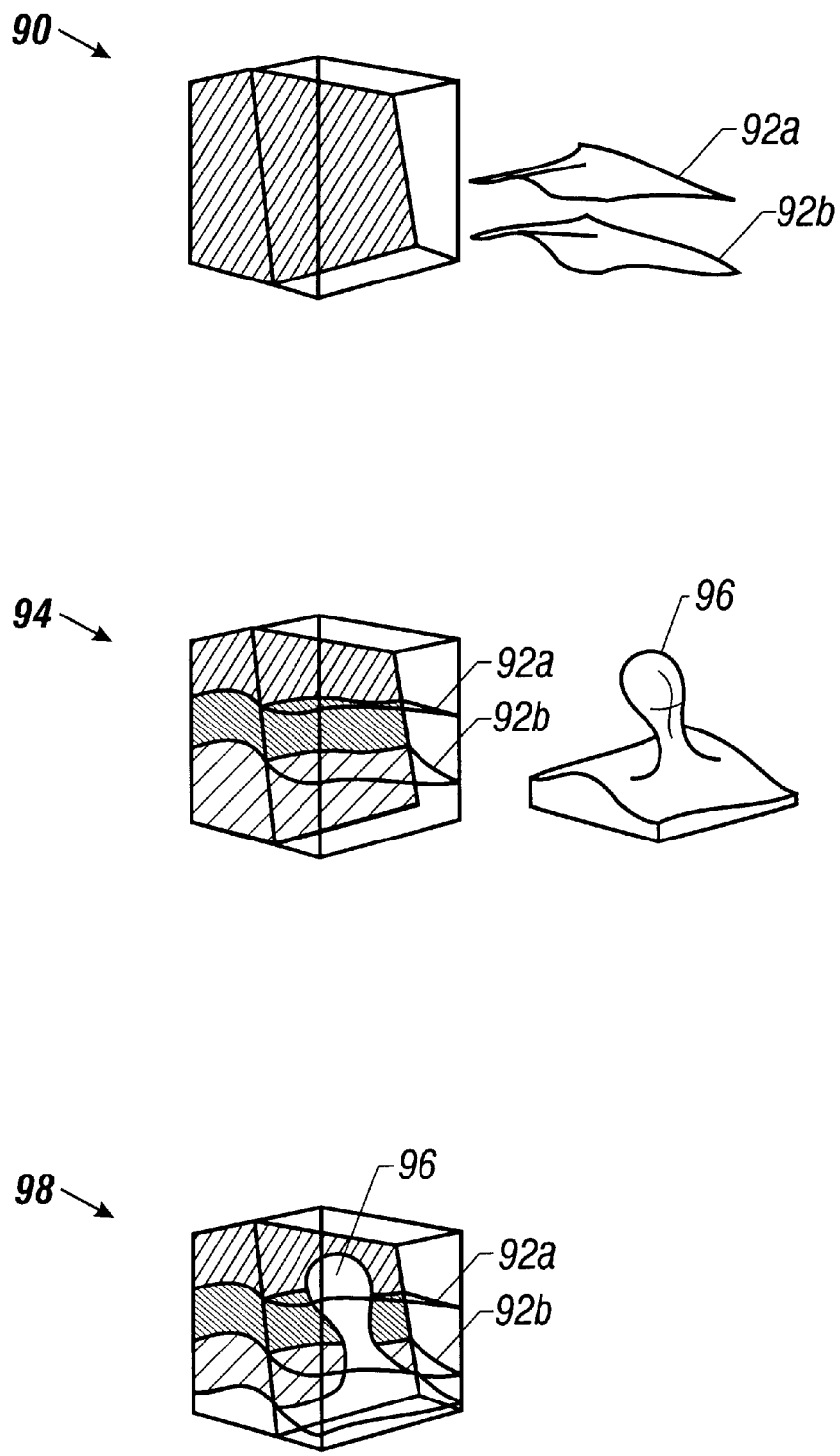

FIGS. 3, 4a, and 4b are representations of stages in a modeling process.

Figure 5A:
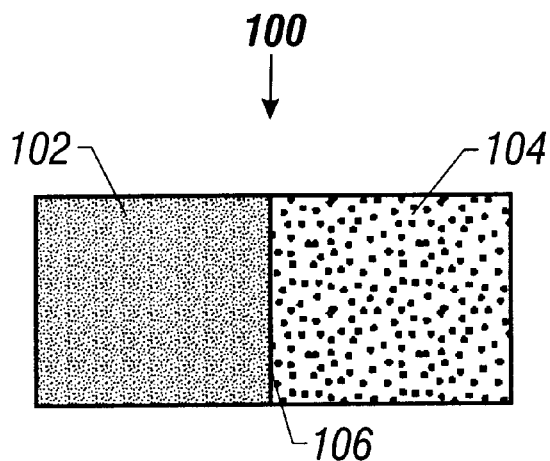
Figure 5B:
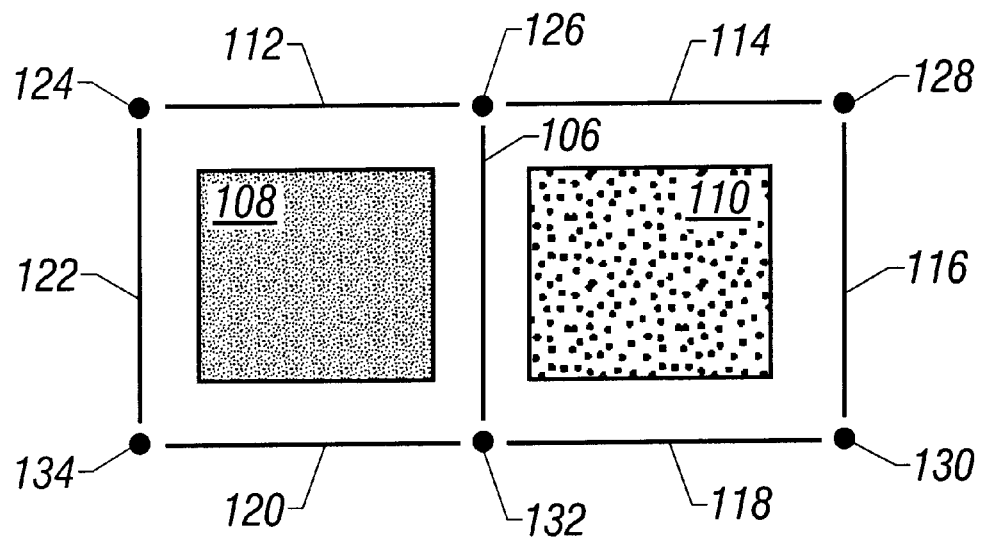
Figure 5C:
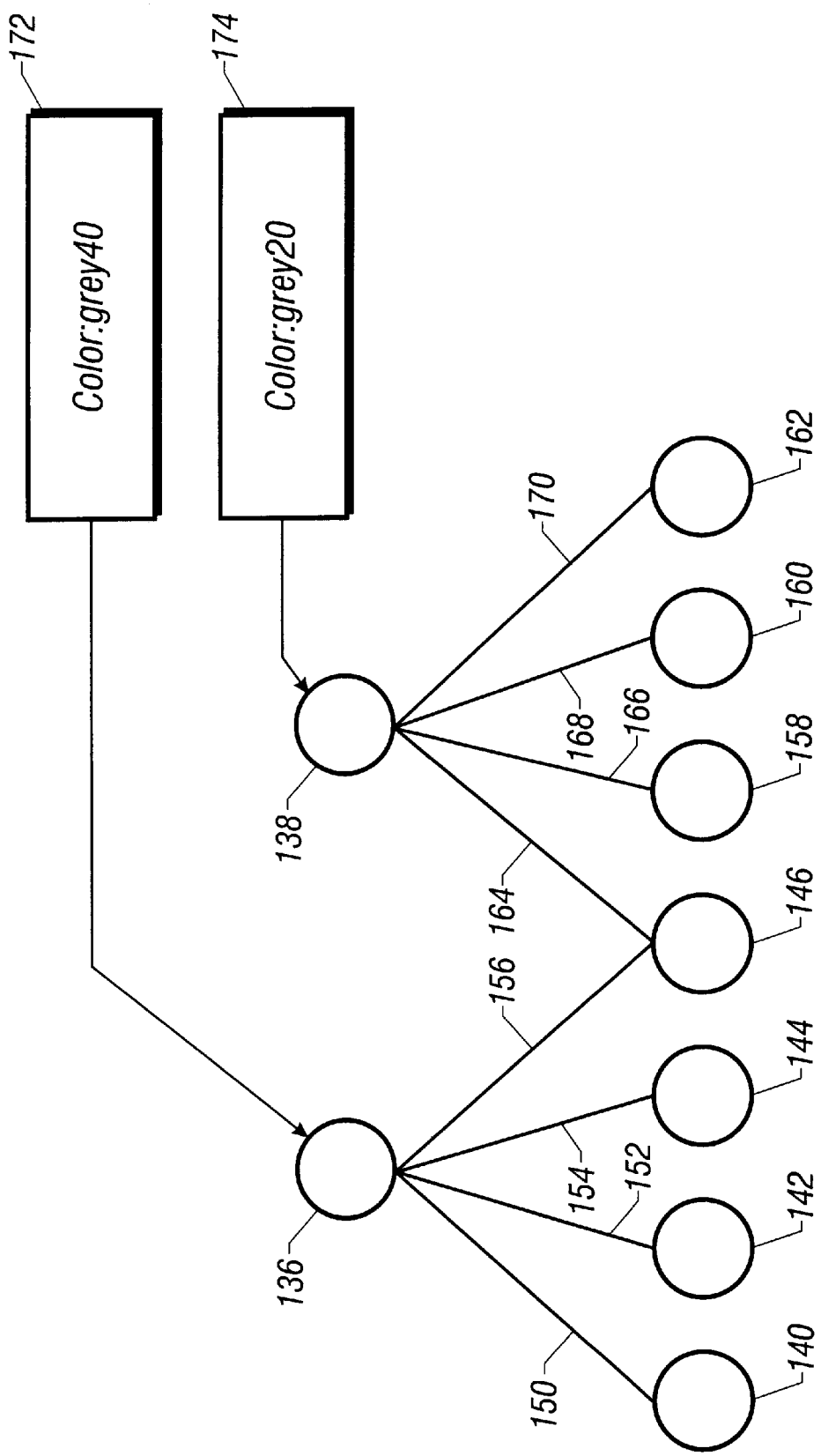

FIG. 5c is a representation of a geometric model.

Figure 6:
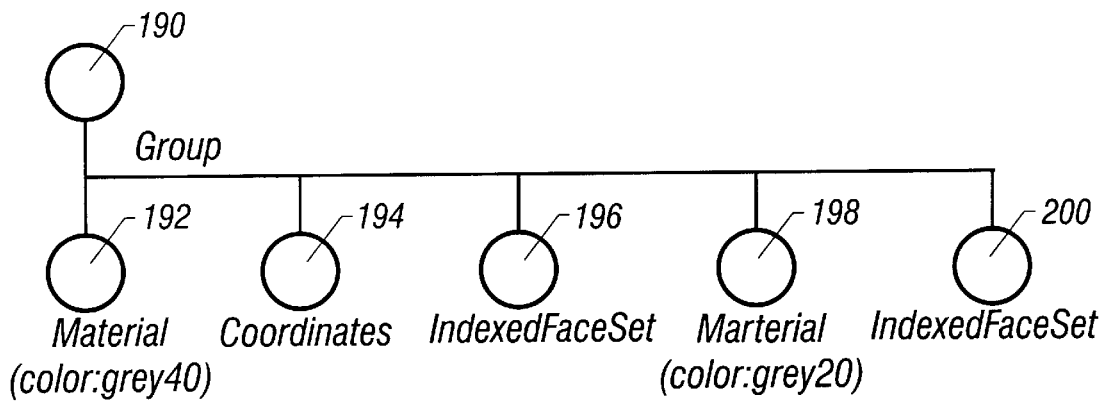

FIG. 6 is a representation of a graphics model.

FIGS. 8–14 are diagrams representing object relationships.

Figure 15:
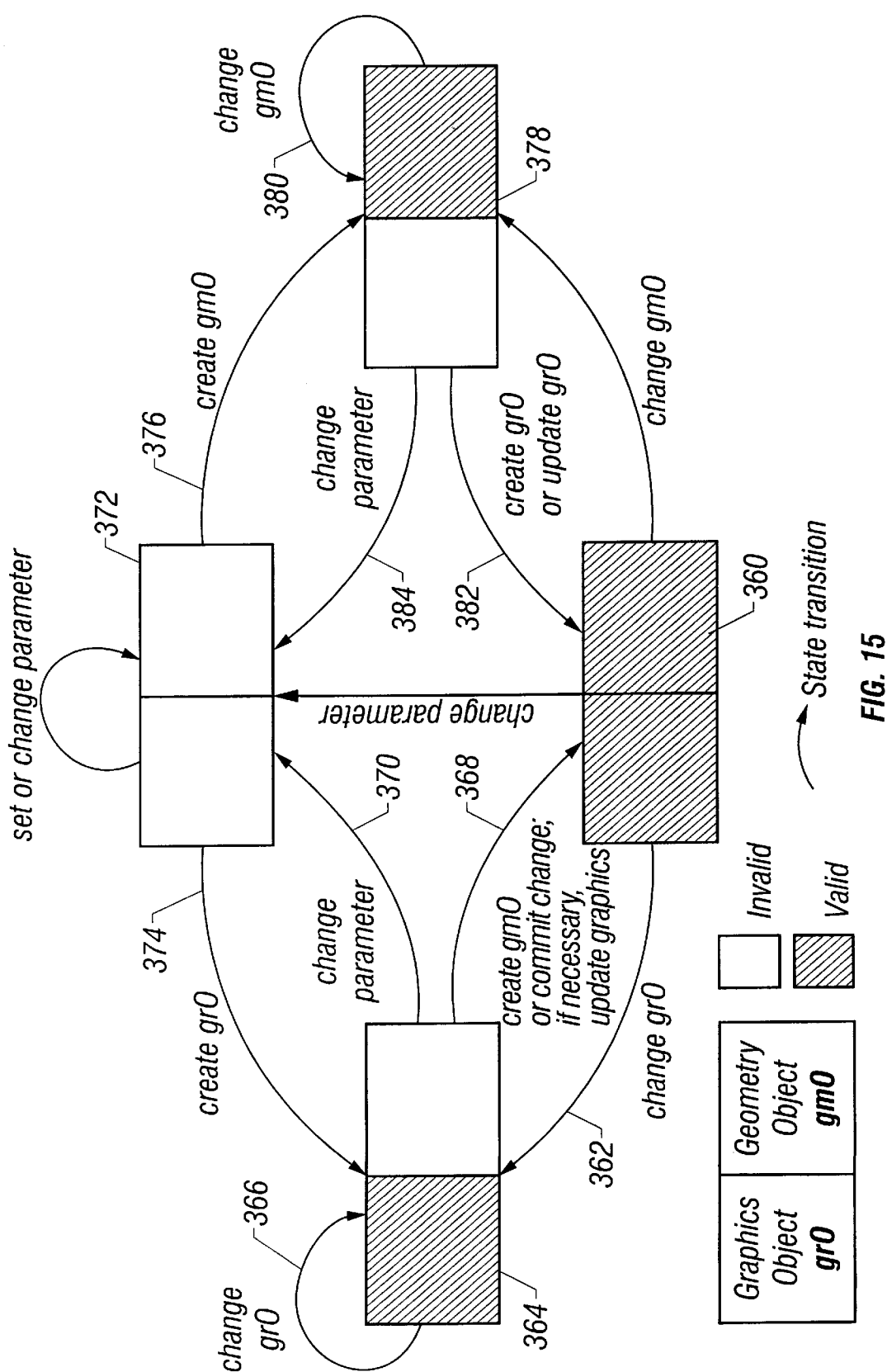

FIG. 15 is a state diagram.

Geometric model building and editing is largely an interactive process that requires adequate graphics support. Given the complexity of interactive computer graphics, it is desirable to write applications using high-level development tools such as OPEN INVENTOR an object oriented graphics library.

Schlumberger Ltd.'s GEOFRAME product, an application for performing geoscience modeling, includes a geometry modeling component, called the GEOMETRY QUERY INTERFACE ("GQI"), which provides an application programming interface ("API") to build and edit solid 3D geometry models. Solid 3D geometry models contain the relationships between the various geometry elements contained in the model. A portion of GQI's geometry modeling functionality is provided by a commercial geometry engine, XOX Corporation's SHAPES package.

A graphics system displays graphic information in such a way that complicated relationships, such as those contained in the geometry model, can be visualized. The SHAPES package includes a graphics system based on OpenGL. For performance reasons, however, it is important to separate graphics interaction and geometry processing. Further, virtually all earth science applications require visualization or interactive graphics but not all of them require geometric modeling. Therefore, it simplifies development to use one generally suitable graphics system for writing applications and to add a geometry engine only where required.

When designing an application including both a graphics and a geometry system, the design issues are not only how to render and visually interact with the geometry model, but also how to make the geometry engine and the graphics engine work together smoothly. In the case of OPEN INVENTOR and GQI/SHAPES, both engines are self-contained and manage their own objects and operations on those objects. The two engines use different internal representations for equivalent objects to describe their geometry, topological relationships, and physical properties. This leads to inconsistencies when the same object is operated on by both engines. Integration of the two engines has to keep track of and reconcile those inconsistencies.

Figure 1:
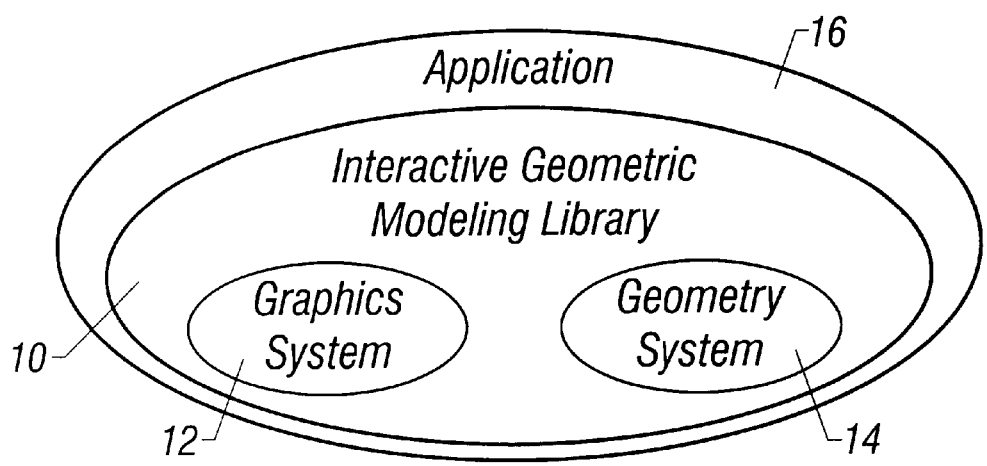
FIGS. 1 and 7 are block diagrams.

One such design, an interactive geometric modeling library ("IGM") 10, integrates a high-level graphics system ("graphics system") 12 and a high-level geometric modeling package ("geometry system") 14, providing an application 16 with a consistent view of both sub-systems, as shown in FIG. 1. The IGM provides an architecture that integrates a graphics system and a geometry system to enable interactive construction, editing, and visualization of geoscience models.

Figure 2:
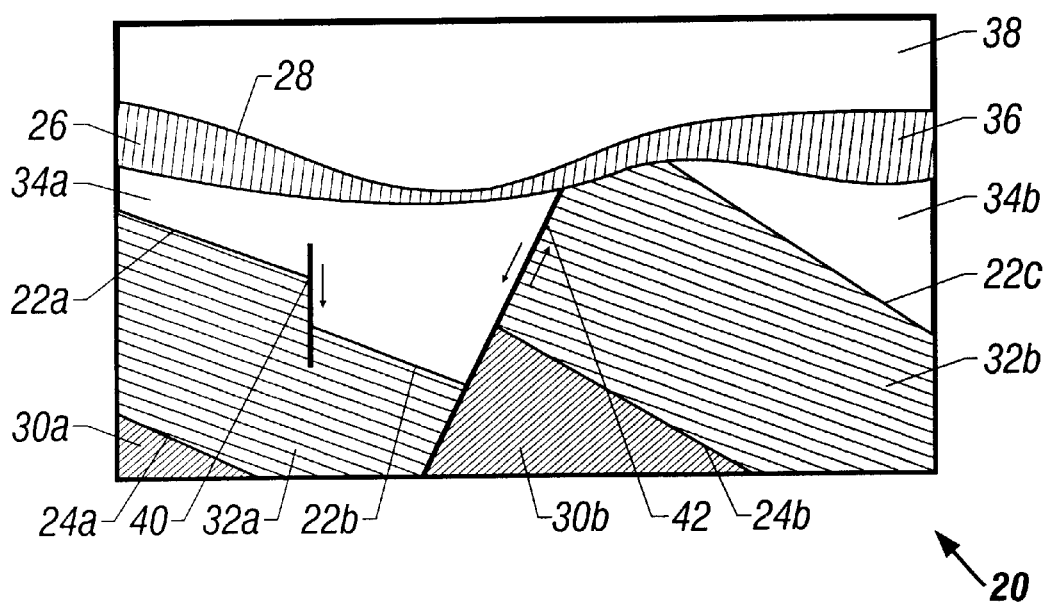
FIGS. 2, 5a and 5b is a representation of items to be modeled.

Earth science applications have specific geometry modeling requirements in addition to those met by conventional CAD packages. Subsurface structures form typically "layer cakes" 20 where "horizons", such as horizon 22a, 22b, 22c, horizon 24a, 24b, and horizons 26 and 28, separate layers, such as segmented layer 30a, 30b, segmented layer 32a, 32b, segmented layer 34a, 34b, and layers 36 and 38, as shown in FIG. 2. Layer cakes are often broken up into "fault blocks", such as fault blocks 30a, 30b, 32a, 32b, 34a, 34b, that are bounded by "faults", such as faults 40 and 42. In terms of geometric modeling, this means that the geometry engine used must support the representation and computation of non-manifold geometries, that is, geometries having mixed dimensions (i.e. 3D fault blocks and 2D faults).

Horizons form the boundaries of layers; faults separate and offset blocks of layers. Logically, layers and horizons are considered single objects even if they are split up and spatially separated as, for example, the horizon 22a, 22b, 22c separating layer 32a, 32b from layer 34a, 34b.

A region of interest 50 may be sub-divided by inserting surfaces 52a, 52b to produce layer cake 54, as shown in FIG. 3. At first, the sub-division appears only on the screen. Once the application is satisfied with the location of the surfaces, it "commits" 56, computing intersections, and establishing connection relationships between all objects in the assembly to produce layer cake 58 and the layers are rendered on the screen to provide screen view 59.

Building geometric models of subsurface structures, or earth models, is largely an iterative process in which models are refined as new subsurface data become available. In FIG. 3, the lower surface 52b is deformed to produce horizon 71, changing the geometry of the layer 60 above it to a wedge or "pinchout". Again, after the application is satisfied, it commits 62, causing the change to be reflected in the geometry model 64 and on the screen 66. In particular, the IGM merges two layers 70 and 72, to produce layer 74, removing horizon 76 in the process. To accommodate such changes, adequate support for model editing is as important as facilities to build models from scratch.

Earth models can be large and may contain several tens to hundreds of surfaces, each represented by several ten-thousands to hundred-thousands of triangles, in the case of a tessellated surface. The IGM must perform well on large data sets. While it may be acceptable, or even required, for some applications to run as batch processes, it must be possible to interactively work with an earth model. This includes viewing a model as well as editing its objects and their attributes.

Different applications have to be able to share the earth model. This means that persistent storage must include all shapes, topological relationships, and attributes which make up a model.

Most commercial geometric modeling systems use boundary representations and architecturally separate the representations of shape, topology, and attributes such as material properties. Some systems are able to represent non-manifold geometries, for example, 3D objects with embedded surfaces or 2D objects with embedded curves. In such objects, boundaries are shared between adjacent components, for example fault 42 is shared by fault blocks 30b, 32a, and 32b, as shown in FIG. 2.

Traditional computer aided design ("CAD") applications build complex 3D geometries by combining primitive 3D building blocks such as blocks and cylinders. This is referred to as constructive solid geometry (CSG) modeling. For example, as shown in FIG. 4a, sub-volumes 80a–d are subtracted from an initial shape 82. Further sub-volumes 84a–c are subtracted producing the final shape 86. CSG modeling is unsuitable for building earth models where the shapes of 3D objects such as geologic layers have to be inferred from the 2D objects that bound them such as horizons and fault planes.

Irregular space partition ("ISP") provides the capability to build earth models because it operates as a sequence of sub-divides and inserts, as shown in FIG. 4b. Region of interest 90 is sub-divided by surfaces 92a and 92b to produce layer cake 94. A sub-volume 96, representing a salt dome, is inserted into layer cake 94 and the shape of the boundaries between the objects is edited to produce the final model 98.

ISP models can, in addition, represent smoothly varying material property fields which may contain internal discontinuities that occur along distinct boundaries. The location of the discontinuity boundaries make up the shape and structure of the model. The shape of discontinuity boundaries is explicitly represented. These boundaries may lie anywhere in an infinite space, have any shape, and intersect one another to partition space into sets of distinct sub-regions.

An ISP model is built by defining a "region of interest" and subdividing it with lower-dimensional objects, for example a subsurface region subdivided into layers by stratigraphic boundaries. In addition to subdividing a region, other regions can be embedded into them. GQI's implementation of ISP modeling supports the notion of features which makes it possible to treat collections of regions as uniform objects.

Geometry engines provide a variety of representations for shapes, including analytical and parametric curve and surface representations. In earth science, triangle meshes are widely used for surface representation.

Topological relationships in a model are represented as a graph in which nodes are topological entities such as vertices, curves, faces, and volumes, and in which edges are connectivity relationships. This is called a boundary representation, or "b-rep". Both CSG and ISP modeling can generate b-reps.

For example, FIG. 5a shows an object 100 comprised of two adjacent rectangles 102, 104 with a shared boundary 106. An exploded version of object 100, shown in FIG. 5b, demonstrates that it comprises two faces 108, 110, seven edges 106, 112, 114, 116, 118, 120, and 122, and six vertices 124, 126, 128, 130, 132 and 134. The topological relationships between these geometric elements, illustrated in FIG. 5c, comprises circles 136 and 138, representing face 108 and 110, respectively. Face 108 is connected to and bounded by four edges 120, 122, 112, and 106, represented by circles 140, 142, 144 and 146, respectively. The "bounded by" relationship is represented by arcs 150, 152, 154, and 156. Face 110 is connected to and bounded by four edges 114, 116, 118, and 106, represented by circles 158, 160, 162 and 146, respectively. The "bounded by" relationship is represented by arcs 164, 166, 168, and 170.

Attributes are typically associated with topological entities. For example, the rectangles' color attribute 172 and 174 may be associated with their corresponding faces 136 and 138, respectively.

Geometric modeling systems support a comprehensive set of geometric operations. These include curve/curve, surface/surface and surface/curve intersections as well as boolean operations such as the union, subtraction, and intersection of solid objects. Boolean operations on solids are also called (topological) classification. Support for non-manifold objects implies that some classifications, namely the Subdivide operation, produce composite rather than "monolithic" objects. Consider, for example, the subdivision of the region of interest 50 by two surfaces 52a and 52b in FIG. 3. In addition to surfaces 52a and 52b, the resulting model contains three layers 180, 182, and 184 that replace the original block.

Many geometric computations run in "interactive time", that is they are completed in less than a few seconds. Boolean operations involving meshes composed of on the order of half a million triangles, however, may take in the order of minutes. Transformation of a single object is very fast; transforming the same object if it forms a piece of a larger assembly may take considerably more time due to the required re-classification.

GQI/SHAPES implements a geometry modeling system that supports representation and computation of non-manifold objects. GQI/SHAPES provides a C-language API with encapsulated abstract data types. Extensibility is given through the SHAPES attribute mechanism that allows applications to register callbacks with attributes. The callbacks are triggered as classification algorithms change the states of their associated objects. GQI/SHAPES defines a proprietary file format for persistent storage.

High-level 3D graphics systems are libraries that encapsulate shape and attribute representations, rendering methods, and interaction methods. Commercial products include OPEN INVENTOR, IRIS PERFORMER, HOOPS, RENDERWARE, COSMO 3D and others. The model uses OPEN INVENTOR, an extensible, object-oriented 3D graphics library. Applications use OPEN INVENTOR calls to create 3D objects and arrange them in a directed acyclic graph (DAG), the so-called scene graph.

For example, the two rectangles with a shared edge illustrated in FIG. 5a may be represented by a screen graph, as shown in FIG. 6. The traversal order in the screen graph is top-to-bottom and left-to-right. A group node 190, is the beginning of the traversal. A next node 192 establishes a material property, namely a color (grey40). Node 194 establishes the beginning coordinates of the image and node 196 establishes an "IndexedFaceSet", or index of the vertices of the left-hand rectangle. Node 198 changes the value of the color material property to grey20 and node 200 establishes an "IndexedFaceSet" for the right-hand triangle. When this screen graph is traversed, the image shown in FIG. 5a is displayed on the screen.

A specific set of classes, called actions, allow applications to create objects that traverse a scene graph and perform operations on its nodes. For example, there is a render action to display the objects in a scene graph, a search action to find objects in a scene graph, etc. The role of the scene graph is to define a traversal order. Actions are used wherever operations must maintain a state that is not stored in the objects but is a side-effect of the operations performed during traversal. For example, the scene graph in FIG. 6 contains one Coordinates node 194 whose coordinates are shared by two IndexedFaceSets. During traversal an array of "current coordinates" is maintained. Each IndexedFaceSet represents one rectangle and contains the indices of its corner coordinates. Similar to coordinates, Material values remain active until overridden by a new Material node. Consequently, in FIG. 6, the first rectangle is drawn in a darker shade of gray than the second.

Another set of classes, called sensors, can be used to monitor nodes and sub-graphs of a scene graph. Applications can associate callbacks with sensors that are triggered each time the state of the "sensed" object changes.

Open Inventor objects include implicit shapes such as boxes, spheres, and cylinders, as well as parametric shapes such as NURBS curves and surfaces, and triangle meshes. While it is possible to create and display shapes, there is no support for geometric computations other than coordinate transformations and ray-object intersections. These operations typically run fast and are dominated by rendering time if re-rendering is required. Interactive work is possible as long as achievable frame rates support it. For example, if a scene can be rendered in 0.1 seconds, an object can be moved around the scene at 10 frames per second.

There are a few important requirements which are met by the IGM's integration of a geometry and a graphics subsystem. First, the IGM provides a consistent, object-oriented interface for interactively constructing, rendering, editing and manipulating 3D objects. Second, the IGM is light weight in terms of overhead. Each sub-system by itself is complex and integration minimizes additional overhead and does not degrade performance. Third, the interface is customizable and extensible.

In addition, there are three major issues described in the above overviews of the geometry and graphics systems which are addressed by the IGM. They are a mismatch in the representations of geometric objects in either system, a mismatch in the representation of object attributes, and a discrepancy in processing speed.

Object representations in the geometry system and in the graphics system do not match. While objects in the geometry system are connected explicitly through a topology graph, as shown in FIG. 5c, graphics objects are merely ordered in a scene graph, as shown in FIG. 6.

Further, in earth models, many surfaces are shared as boundaries between adjacent objects and, consequently, serve two roles in the geometry system. First, they are objects in their own right, used to build an earth model by subdividing some region in space. Second, they are bounding surfaces of rock layers, and as such they are parts of layer objects. In the graphics system, when an earth model is rendered, it may be rendered as a set of surfaces or as a set of layers, or a mix of both. When rendering a set of layers, shared surfaces are rendered only once for good performance.

As a consequence, there is no one-to-one relationship between geometric objects and graphic objects. Rather, the graphic objects must be transient representations of geometric objects which potentially leads to data replication when two representations of object data must be maintained. Further, data replication requires data consistency control to guarantee that, as one representation of an object changes, its other representation is updated as well.

Attributes in the geometry system are directly associated with objects or pieces of objects, such as color attributes 172 and 174 in FIG. 5c. Attributes in the graphics system are not explicitly associated with geometric objects. Rather, they are "autonomous" objects in a scene graph, such as nodes 192 and 198 in FIG. 6, that affect the rendering state and thus, indirectly, control the appearance of rendered shapes.

The IGM supports interactive work with complex geometric models. It is possible to monitor the changes that users make to the graphics representation of objects, requiring users to "commit" any changes to the geometric representation when desired. Consider the examples in FIG. 3. To subdivide a region of interest 50 with surfaces 52a and 52b, the surfaces must first be positioned correctly. This could be done interactively by manipulating the graphics representations of the surface geometries only. In this phase, the geometry model is not consistent with what is visible on the screen. Next, a classification is performed to incorporate the surfaces into the geometric model. After this process, which may take some time, the geometry model 58 and the rendering on the screen 54 are again consistent.

Both the graphics system and the geometry system may be extensible systems. The primary design choice in integrating the two systems is whether to view one system as the primary system and extend it by functionality found in the other, or to create an integration layer on top of both subsystems. The model uses the latter approach. With an integration layer integrating the graphics system and the geometry system, either subsystem can be replaced if necessary, a clear separation exists between graphics and geometry operations, and it is possible to have a distributed implementation in which each subsystem runs on a different host.

The integration layer is implemented in C++. The next design choice is whether to use multiple inheritance or object aggregation. With multiple inheritance, the grandchildren inherit a child's parents without access to any of their other descendants. It was desired to model "cousin"-relationships where descendants in one hierarchy are associated with descendants in other hierarchies, and therefore multiple inheritance is not appropriate.

Further, the preferred embodiment does not completely encapsulate the subsystems but rather exposes them to applications. This minimizes overhead, because it leaves objects accessible for operations that are specific to their respective subsystems, while allowing applications to manage only the objects defined in the integration layer. Data consistency control helps to avoid the consequential creation of inconsistencies between the subsystems.

Figure 7:
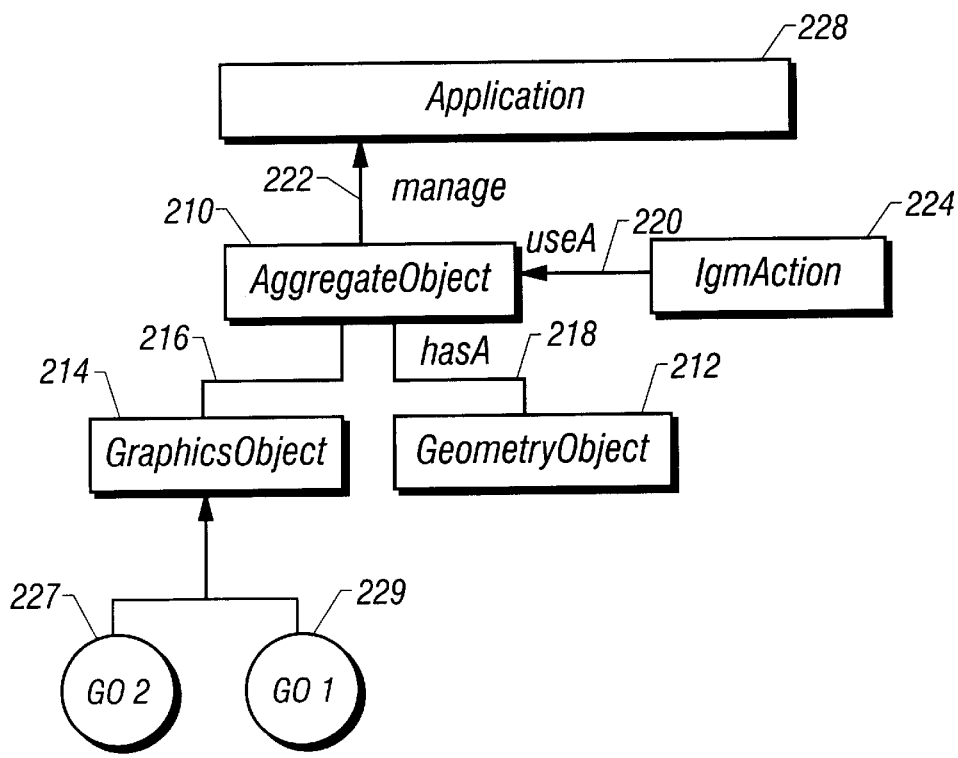

The model uses "object aggregation" in the design of the integration layer. An "AggregateObject" class 210 encapsulates the common aspects of a GeometryObject representation 212 and a GraphicsObject representation 214 of an object, as shown in FIG. 7. Lines 220 and 222 denote one-to-many relationships, represented by a line with an arrow on one end, with the "one" relationship being at the end with the arrow. For example, line 222 indicates that a single Application 228 manages a plurality of AggregateObjects, one of which is AggregateObject 210 (the others are not shown). Lines 216, 218 indicate one-to-one relationships. In the example shown, AggregateObject 210 has one GraphicsObject 214, one Geometryobject 212, and uses one or more IgmActions 224. The GraphicsObject class may include multiple graphic views 227 and 229 of the same GeometryObject.

The "IgmAction" class 224, shown on FIG. 7, encapsulates methods required to either traverse a topology graph and generate appropriate graphics representations or to traverse a scene graph removing obsolete GraphicsObjects or to generate a GeometryObject.

Figure 8:
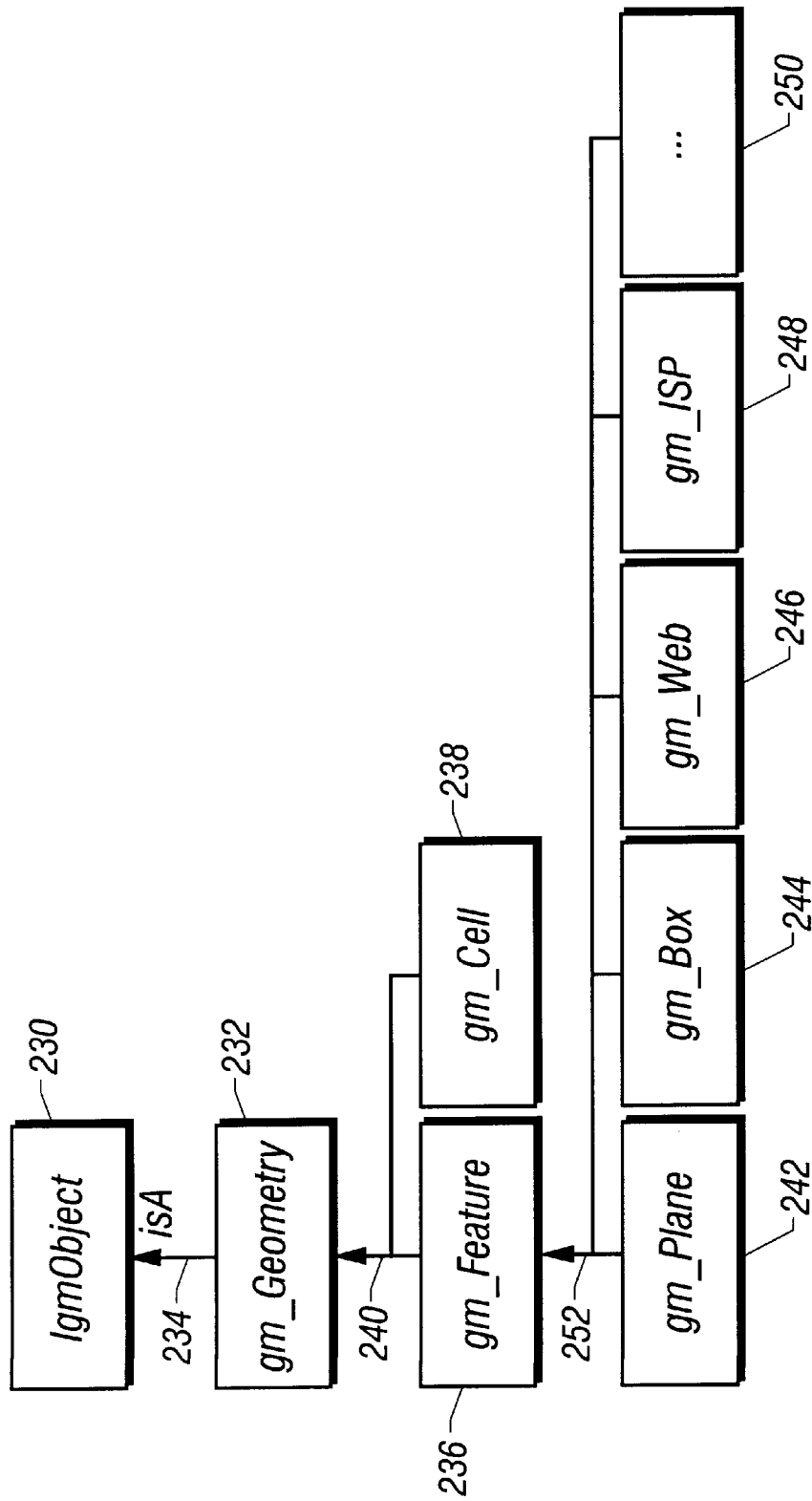

A GeometryObject class hierarchy provides C++ wrappers for geometric objects in the geometry subsystem, as shown in FIG. 8. At the top of the tree, the IgmObject 230 is the GeometryObject base class. The gmGeometry class 232 (the underscore in variable names shown in the Figures, such as the one between "gm" and "Geometry" in FIG. 8, is left out in the text portion of the specification) is a subclass of the IgmObject, subclassing being represented by a line with an arrow-head at its midpoint, such as line 234. The gmGeometry class has two subclasses, gmFeature 236 for features and gmCell 238 for cells, with the sub-classing indicated by a line 240. The gmFeature class and the gmCell class store GQI handles to features and cells, respectively. The gmFeature class has a number of sub-classes, including gmPlane 242 for a plane, gmBox 244 for a box, gmweb 246 for a web, gmISP 248 for an ISP, and others 250, with the sub-classing indicated by a line 252.

Figure 9:
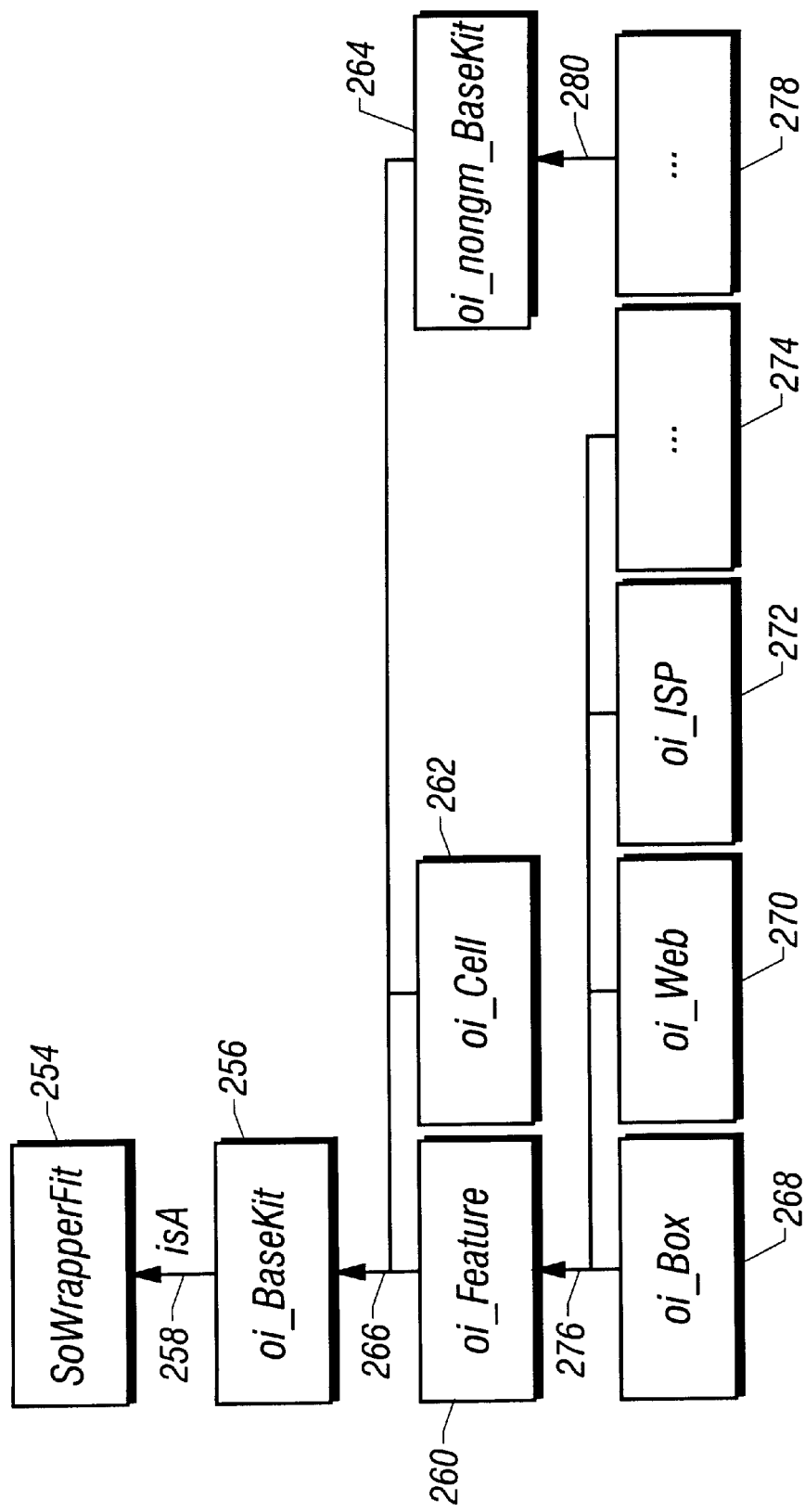

The GraphicsObject class hierarchy describes objects that can be rendered on the screen, as shown in FIG. 9. The GraphicsObject class is responsible for rendering GeometryObjects and handling graphical interactions. At the top of the GraphicsObject tree is an OPEN INVENTOR's SoWrapperKit 254, which provides a mechanism to build and manage scene sub-graphs. Typically, those subgraphs contain attribute and shape nodes. Thus, SoWrapperKits associate attributes and shapes, providing a simple way to handle the attribute representation mismatch between the graphics and geometry subsystems. An oiBaseKit 256 is a subclass of the SoWrapperKit, as indicated by a line 258. The oiBasekit has a number of subclasses including an oiFeature class 260, an oiCell class 262 and oinongmBasekit class 264, with the sub-classing being indicated by a line 266. The oiFeature class has a number of subclasses, including an oiBox class 268, an oiweb class 270, an oiISP class 272, and other classes 274, the subclassing being indicated by a line 276. Further, the oinongmBaseKit, which renders objects that are not part of the geometry model, has a number of subclasses 278, the sub-classing being indicated by a line 280.

Graphics objects, except those graphics objects that are not part of the geometry model, contain a scene graph representing the current rendering of their corresponding GeometryObjects, such as that shown in FIG. 6. For example, the GraphicsObject for an ISP model may contain a scene graph populated with GraphicsObjects representing its constituent features. Applications add GraphicsObjects to their own scene graph to render the desired portions of a geometry model. Usually, the application adds the GraphicsObject of a new unclassified object to the scene graph. After classification, the new object becomes part of a composite object and its "stand-alone" representation is removed from the scene graph. The GraphicsObject for the ISP model is either added to the scene graph or is updated if it already had been added.

Changes made to the GraphicsObject through user interaction can be monitored by Open Inventor sensors. Sensors can trigger callbacks that notify an AggregateObject of the change. Users interact with GraphicsObject via an IGM interactor. The changes are graphical only until the user is satisfied, and the application notifies the AggregateObject to update the GraphicsObject and propagate the changes to the GeometryObject.

GraphicsObjects do not need to be as specialized as GeometryObjects although specialization is possible where required. In many cases, the generic GraphicsObject suffices to encapsulate the required functionality. Exceptions include objects for which a pure graphical representation exists that is not constructed from a GeometryObject, for example surfaces built from extruded curves before they have been classified; and objects that require special interaction, such as web surfaces which require special interactions to edit or deform.

Figure 10:
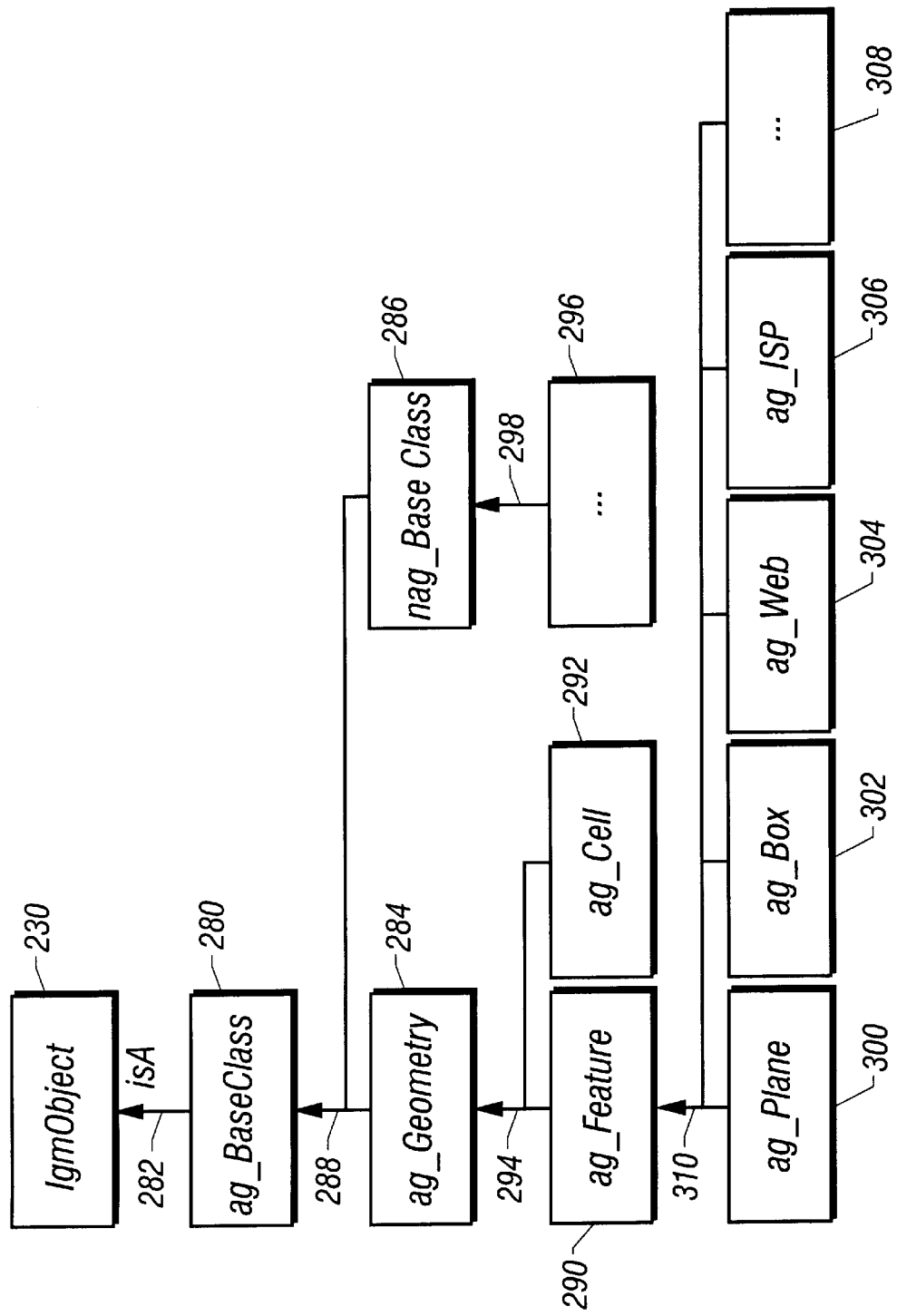

The AggregateObject class hierarchy represents integrated objects, as shown in FIG. 10. At the top of the AggregateObject class tree is the IgmObject 230 which was also at the top of the GeometryObject class hierarchy (see FIG. 8). An agBaseClass 280 is a subclass of the IgmObject class 230, with the subclassing being indicated by a line 282. The agBaseClass class has two subclasses: a agGeometry class 284 and a nagBaseClass class 286, the subclassing being indicated by a line 288. The agGeometry class has two subclasses, an agFeature class 290 and an agcell class 292, the subclassing being indicated by a line 294. The nagBaseClass 286, which represents objects that are not part of the geometry model, has a plurality of subclasses 296, the subclassing being indicated by a line 298. The agFeature class has a number of subclasses, including a agPlane class 300, an agBox class 302, an agweb class 304, an agISP class 306 and other classes 308, the subclassing being indicated by a line 310.

Figure 11:
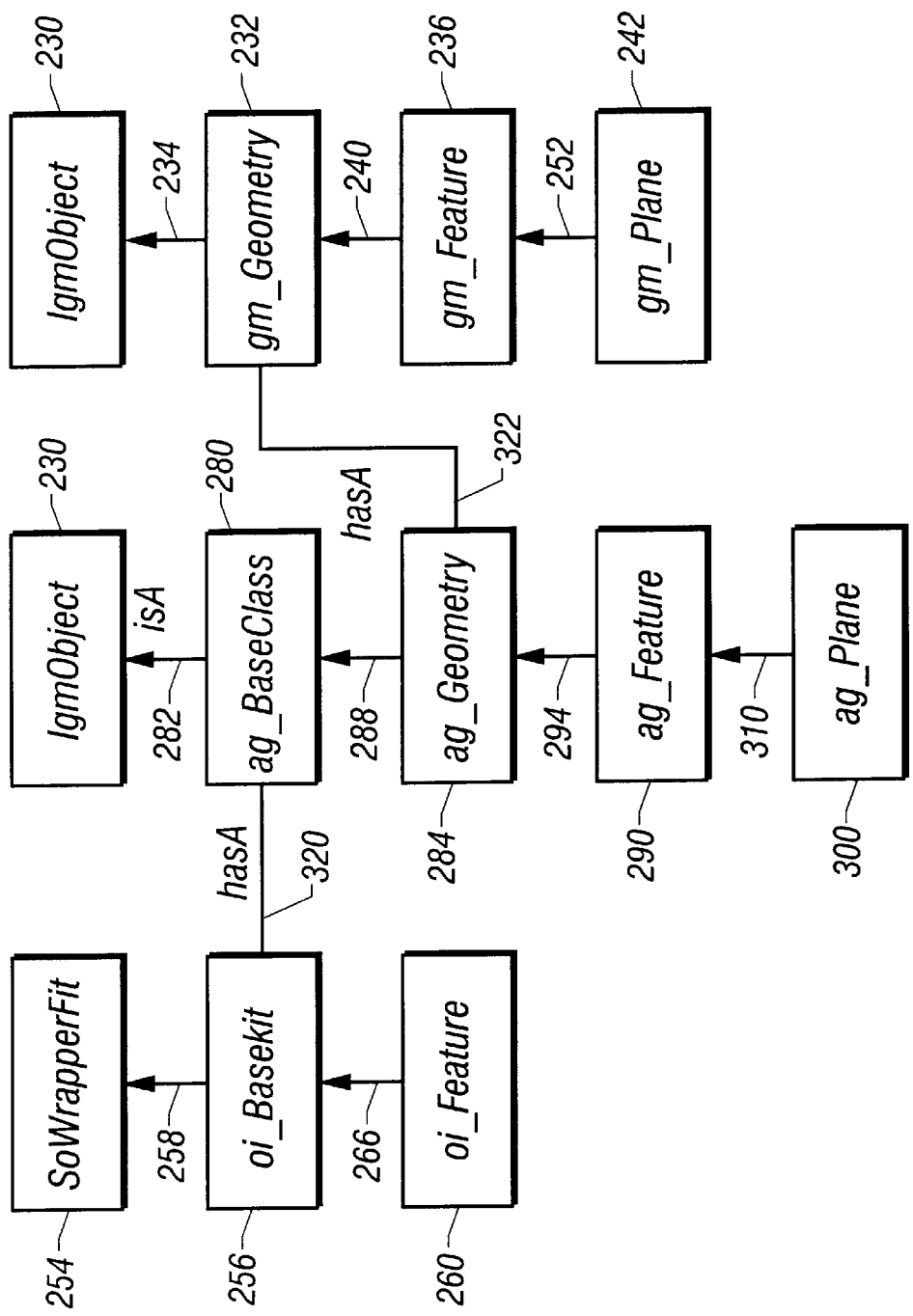

AggregateObject represents the integration of data and methods shared between GraphicsObject and GeometryObject. For example, the agplane object together with its corresponding GraphicsObjects and GeometryObjects form a class hierarchy, as shown in FIG. 11. Most of the hierarchy is extracted from the class hierarchies illustrated in FIGS. 8–10. The association between the aggregate class and the graphics class, represented by a line 320, and the association between the aggregate class and the geometry class, represented by line 322, have been added and represent the aggregation.

AggregateObjects can be constructed from object parameters, for example a point and the normal of a plane. The AggregateObject class provides methods to construct its corresponding GraphicsObjects and GeometryObjects. Applications control when to create the sub-objects.

Alternatively, AggregateObjects can be constructed from existing GraphicsObjects or from existing GeometryObjects. This allows applications to import objects from packages that provide only the equivalent of graphics representations (for example, other OPEN INVENTOR applications). More importantly, it allows applications to use GeometryObjects representations, complete with shape, topological, and attribute information, for persistent storage. Typically, AggregateObjects and GraphicsObjects are created on the fly when GeometryObjects are loaded from persistent storage.

The three class trees are similar but have some differences. For example, the three class trees are of different depths. All three classes support dynamic type checking.

The IGM defines a number of standard objects in addition to the generic GraphicsObjects, GeometryObjects, and AggregateObjects. For example, the GeometryObject class hierarchy contains many subclasses because they encapsulate the different objects that can be modeled with the geometry system. The GraphicsObject hierarchy contains fewer objects because many GeometryObjects can be rendered using generic methods. For example, there is a specific GeometryObject for a plane, 242 in FIG. 8, but no specific GraphicsObject, as shown in FIG. 9. Other objects such as meshed surfaces and composite objects require support for interactive editing which is implemented in specialized GraphicsObjects. Composite objects may become fairly complex and are encapsulated in a special class that manages updates on a per-component basis.

Figure 12:
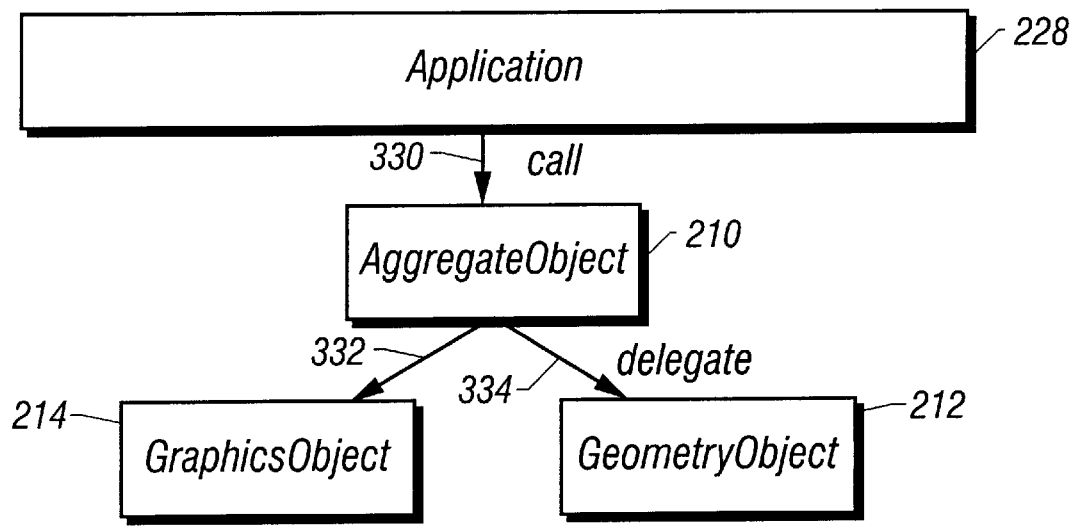
Figure 13:
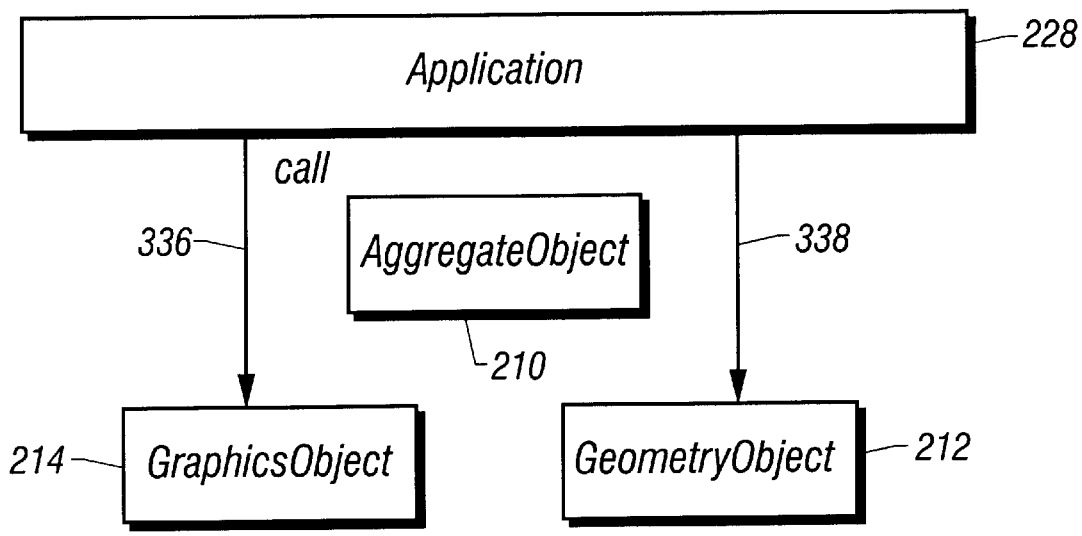

Applications instantiate and manage AggregateObjects, as shown in FIG. 7. AggregateObjects also provide graphics and geometry operations through calls 330 to the AggregateObject which are then delegated to the appropriate subobjects, either the GraphicsObject 214, through delegation path 332 or to the GeometryObject 212 through delegation path 334, as shown in FIG. 12. Applications also have read-only access to GraphicsObjects and GeometryObjects through call paths 336 and 338, respectively, to perform operations that do not affect system consistency, as shown in FIG. 13. Through this exposure, the requirement of minimal overhead can be met because replication of GraphicsObject or GeometryObject methods in AggregateObject is minimized.

Figure 14:
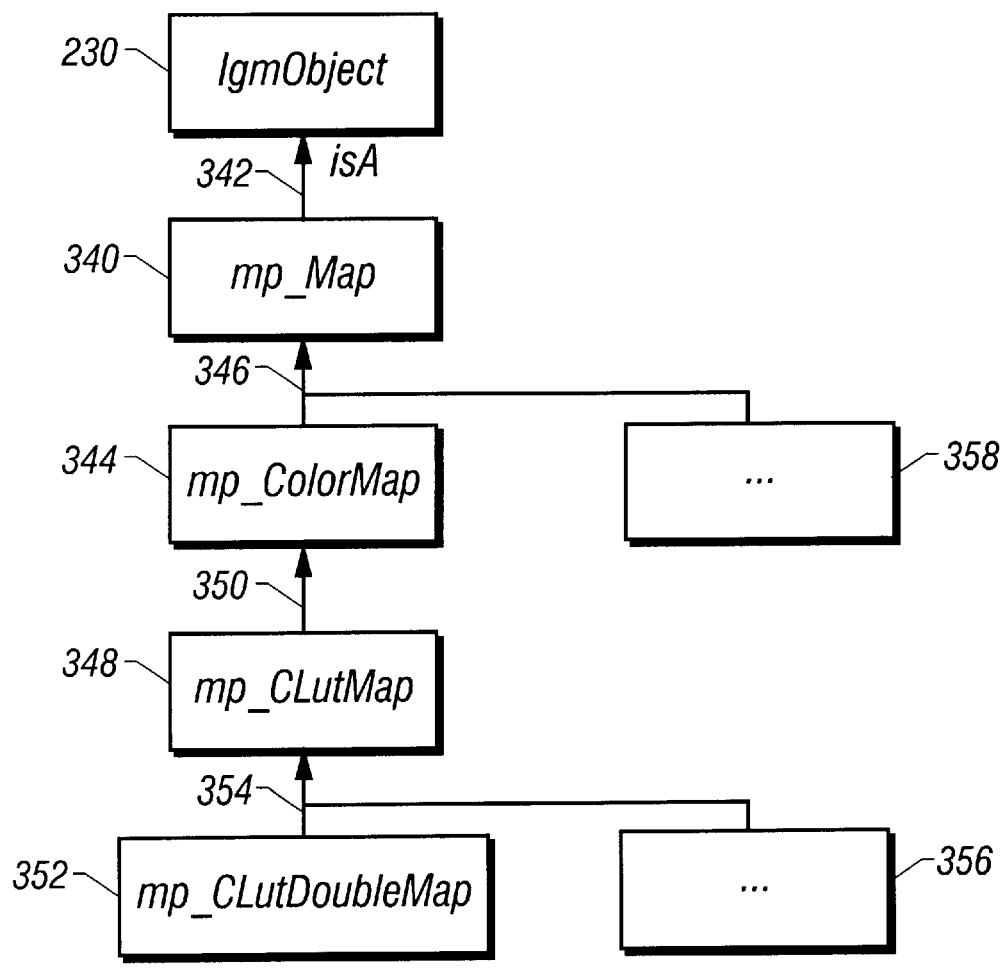

Special classes, illustrated in FIG. 14, whose root class is mpMap 340 (which is itself rooted in the Igmobject class 230 as shown by line 342) implement the necessary data format translations and mappings from physical properties to renderable attributes. For example, an mpColorMap class 344, subclassed from the mpMap class as shown by line 346, and mpCLutMap class 348, subclassed from the mpColorMap class 344 as shown by line 350, provide color maps that can be indexed in a number of ways. An mpCLutDoubleMap class 352, subclassed from the mpCLutMap class as shown by line 354, provides methods to map colors to ranges of double precision floating point numbers. There are other classes, 356 and 358, subclassed from the mpMap and mpCLutMap classes, respectively.

GeometryObject uses the callback mechanism available through GQI/Shapes attributes the same way GraphicsObject uses Open Inventor sensors: AggregateObject is notified of changes to the state of a geometry object.

The AggregateObject fulfills a number of tasks, two of which, consistency control and data conversion management, will be discussed in more detail. The tasks are:

1. Integrate GraphicsObject and GeometryObject, providing applications with a simple consistent interface to the geometry and graphics subsystems.

2. Manage object consistency. For example, GraphicsObject transformations can be performed interactively while GeometryObject transformations may require time because they may require intersections and topological relationships to be recomputed. AggregateObject keeps track of whether transformations have been applied in both subsystems.

3. Minimize side effects of edit operations. ISP objects may consist of many sub-objects not all of which are typically affected by a classification involving the composite object. By managing state changes at the boundary representation level, AggregateObject localizes required updates.

4. Manage "flat geometry data" conversion between GeometryObject and GraphicsObject. Flat geometry data are shape descriptions without the representation of topological relationships.

5. Manage picks. Picking will usually be initiated by GraphicsObject but for some subclasses will be performed by the corresponding GeometryObject. The AggregateObject coordinates picking and communicates results.

The two subsystems being integrated by IGM are not always consistent, that is, they sometimes have inconsistent representations of the same geological data. Often, the two subsystems are intentionally left inconsistent for the duration of an extended edit operation to improve performance.

There are a finite number of possible "valid/invalid" states for the two sub-objects, and AggregateObject can be treated as a finite state machine with the two sub-objects as state variables, as shown in FIG. 15. Sub-objects can be either "valid" or "invalid", depending of whether or not they represent the result of the last user interaction. AggregateObject monitors and manages the transition from one state to another, thus managing consistency and addressing the issue of processing speed discrepancies.

The state machine operates by changing states in response to a variety of events. Assume that both the GraphicsObject and the GeometryObject are valid, which means that the system is in state 360. The left half of a box representing a state, such as state 360, is shaded or unshaded if the GraphicsObject is valid or invalid, respectively. Similarly, the right half of the box is shaded or unshaded if the GeometryObject is valid or invalid, respectively. Both halves of the box representing state 360 are shaded, indicating that both the GraphicsObject and the GeometryObject are valid.

Now assume that the GraphicsObject changes. An example of such a change would be an application picking a graphics object and moving it without committing to the move. Such a change is represented by transition 362 to state 364, in which the GraphicsObject is valid but the GeometryObject is invalid. The system does not transition out of this state if the GraphicsObject is further changed, as indicated by transition 366.

If the change to the GraphicsObject is committed causing the change (such as classifying a moved surface) to be made in the GeometryObject, or if a GeometryObject is created, the system transitions 368 back to state 360, in which both the GraphicsObject and the GeometryObject are valid. If, instead, a parameter is changed, the system transitions 370 to state 372, in which both the GraphicsObject and the GeometryObject are invalid. Further setting of or changes to parameters leaves the system in state 372.

The system can leave state 372 under two circumstances. If the system creates a GraphicsObject, the system transitions 374 back to state 364, where the GraphicsObject is valid and the GeometryObject is invalid. If, instead, the system creates a GeometryObject, the system transitions 376 to state 378, where the GraphicsObject is invalid and the GeometryObject is valid. The system remains in state 378 for further changes in GeometryObject 380. If the GraphicsObject is updated or a GraphicsObject is created, the system transitions 382 to state 360. If, instead, a parameter is changed, the system transitions 384 from state 378 to state 372, where both the GeometryObject and the GraphicsObject are invalid.

Consider the example in FIG. 3 where the user positions new surfaces on the screen. The graphics representations of the surfaces are valid since they have the shape and position intended by the user. The geometric model is invalid, because the objects overlap existing objects without establishing topological relationships between them. Thus, the system is in state 364. Once the user commits to the change, the system transitions 368 to state 360, changing the geometry and updating the graphics.

Methods that perform complex conversions between GeometryObject and GraphicsObject are implemented as their own classes and their base class is called IgmAction 224, as shown in FIG. 7. IgmAction objects can traverse either a scene graph or a topology graph, performing desired operations and calling methods on individual objects as appropriate. IgmAction is the component that handles the aspect of geometric object representation mismatch between the sub-systems. It is used by AggregateObject to support consistency management.

An example is an IgmAction that can create or update GraphicsObjects from GeometryObjects according to several different rendering modes, depending on which GraphicsObjects will contain different attributes and shapes to render. Rendering modes include:

1. Rendering of sub-volumes, where each volume's bounding surfaces are rendered (boundaries between adjacent volumes are rendered only once). In this mode, picks return volume objects and clipped volumes are rendered as closed objects (as opposed to objects that appear to be cut open);

2. Rendering of surfaces that partition space. Picks return surfaces and clipping may create holes in surfaces.

Another example of an IgmAction is the creation of a GeometryObject from a pre-existing GraphicsObject. Examples of objects that are generated as GraphicsObjects first are interactively sketched objects such as extruded curves or objects imported from other graphics applications.

The management of rendering modes illustrates that GraphicsObjects are visual representations of their corresponding GeometryObjects. As described above, there is no one-to-one relationship between the two object types. For example, which shapes are rendered by a GraphicsObject representing a volume depends on adjacent objects and the presence of clipping planes.

Not all objects to be displayed in a 3D view are necessarily objects forming, or intended to form, part of a geometry model. Examples include text, symbols, and glyphs. In addition, many applications work with data that have a geometric interpretation which is rendered but is not part of a geometry model. An example from earth science is a borehole trajectory that may be rendered for reference only. IGM provides agBaseClass 280 (FIG. 10) from which nagBaseClass 286 for such "non-geometry-model", objects is derived. The equivalent GraphicsObject of nagBaseClass is oinongmBaseKit 264 (FIG. 9).

This approach allows applications to manage one generic type of objects regardless of whether they are to be used for the geometry model. For example, a SceneManager class can be written that keeps track of objects that are displayed or hidden in one or more application windows. In addition, subclasses of nagBaseClass can encapsulate the bindings of GraphicObjects to entities stored in a database.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

What is claimed is:

1. A method for interactively constructing, editing, rendering and manipulating geoscience models by integrating a geometry system and a graphics system, each having a distinct functionality, the method comprising providing the functionality of the geometry system by a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

providing the functionality of the graphics system by a graphics hierarchy of classes, wherein the graphics system functionality includes rendering a model, and wherein objects in the graphics system are connected to one another in a scene graph; and aggregating the functionality of a geometry system and a graphics system, by providing the functionality of an aggregate hierarchy of classes, the aggregate hierarchy of classes connecting the geometry hierarchy of classes and the graphics hierarchy of classes.

2. The method of claim 1, wherein the geometry system is separate from the graphics system.

3. The method of claim 1, wherein aggregating comprises providing the functionality of two or more objects.

4. The method of claim 3, wherein the geometry system uses a first internal representation for an object's geometry and the graphics system uses a second internal representation for the object's geometry.

5. The method of claim 4, wherein the first internal representation for the object's geometry is different than the second internal representation for the object's geometry.

6. The method of claim 5, further comprising making a tentative change to the geometry system's representation of the object's geometry or to the graphic system's representation of the object's geometry;

making permanent the tentative change when the tentative change is committed; and detecting an inconsistency between the geometry system's representation of the object's geometry and the graphic system's representation of the object's geometry.

7. The method of claim 6, further comprising resolving the inconsistency.

8. The method of claim 4, wherein the geometry system's representation of the object's geometry is empty.

9. The method of claim 8, wherein the object comprises text.

10. The method of claim 8, wherein the object comprises a three-dimensional symbol.

11. The method of claim 4, wherein aggregating comprises representing non-manifold geometries.

12. The method of claim 3, wherein the geometry system uses a first internal representation for an object's property and the graphics system uses a second internal representation for the object's property.

13. The method of claim 12, wherein the first internal representation for the object's property is different than the second internal representation for the object's property.

14. The method of claim 13, further comprising making a tentative change to the geometry system's representation of the object's property or to the graphic system's representation of the object's property;

making permanent the tentative change when the tentative change is committed; and detecting an inconsistency between the geometry system's representation of the object's property and the graphic system's representation of the object's property.

15. The method of claim 14, further comprising resolving the inconsistency.

16. The method of claim 1, further comprising providing an interface to the aggregated geometry system and graphics system.

17. The method of claim 16, further comprising customizing the interface.

18. The method of claim 17, further comprising extending the interface.

19. The method of claim 1, further comprising classifying a surface into a volume.

20. The method of claim 1, wherein aggregating comprises distributing the functionality of the geometry system and the functionality of the graphics system.

21. The method of claim 20, wherein distributing comprises executing the functionality of the geometry system on a first processor; and executing the functionality of the graphics system on a second processor.

22. The method of claim 1, further comprising providing mapping between a property in the geometry system and a renderable attribute in the graphics system.

23. The method of claim 1, wherein providing the functionality of the geometry system comprises providing an editing capability.

24. The method of claim 23, wherein the editing capability localizes an edit.

25. The method of claim 1, wherein an object, not a part of the geometry system, is part of the graphics system.

26. A method for interactively constructing, editing, rendering and manipulating geoscience models in a geoscience modeling system having a graphics system and a geometry system comprising providing the functionality of the geometry system by a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

providing the functionality of the graphics system by a graphics hierarchy of classes, wherein the graphics system functionality includes rendering a model, and wherein objects in the graphics system are connected to one another in a scene graph; and enforcing consistency between the geometry system and the graphics system.

27. The method of claim 26, wherein enforcing consistency comprises representing geoscience features as objects in both the geometry hierarchy and in the graphics hierarchy; and allowing inconsistency between corresponding objects in the geometry hierarchy and the graphics hierarchy when an application makes a change to an object in one of the hierarchies.

28. The method of claim 27, wherein enforcing consistency further comprises resolving the inconsistency when the application commits to the change.

29. The method of claim 26, wherein enforcing consistency comprises allowing inconsistency when an application initiates a change to both of the systems and one of the systems is faster at making the change than the other system.

30. The method of claim 29, further comprising resolving the inconsistency when the other system completes the change.

31. A method for interactively constructing, editing, rendering and manipulating geoscience models comprising providing a geometry system having a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

providing a graphics system having a graphics hierarchy of classes, wherein the graphics system functionality includes rendering a model, and wherein objects in the graphics system are connected to one another in a scene graph; and interfacing a geometry system and a graphics system to an application through an integration layer having an aggregation of the geometry hierarchy of classes and the graphics hierarchy of classes.

32. The method of claim 31 further comprising
selectively bypassing the integration layer.

33. The method of claim 31, wherein the integration layer does not completely encapsulate the geometry system and the graphics system.

34. A computer system for interactively constructing, editing, rendering and manipulating geoscience models comprising means for aggregating the functionality of a geometry system and a graphics system, wherein the geometry system having a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically and the graphics system having a graphics hierarchy of classes, wherein the graphics system functionality includes rendering a model, and wherein objects in the graphics system are connected to one another in a scene graph and wherein the means for aggregating presents a common application program interface for both hierarchies.

35. The computer system of claim 34, further comprising means for providing the functionality of the geometry system by the geometry hierarchy of classes; and means for providing the functionality of the graphics system by the graphics hierarchy of classes.

36. The computer system of claim 25, wherein aggregating comprising means for providing the functionality of an aggregate hierarchy of classes, the aggregate hierarchy of classes connecting to the geometry hierarchy of classes and to the graphics hierarchy of classes.

37. The computer system of claim 35, wherein the means for providing the functionality of the geometry system comprises means for providing an editing capability.

38. The computer system of claim 37, wherein the editing capability localizes an edit.

39. The computer system of claim 35, wherein an object, not a part of the geometry system, is part of the graphics system.

40. The computer system of claim 34, wherein the geometry system is separate from the graphics system.

41. The computer system of claim 34, wherein the means for aggregating comprises means for providing the functionality of at least one object from the graphics hierarchy and at least one object from the geometry hierarchy.

42. The computer system of claim 41, wherein the geometry system uses a first internal representation for an object's geometry and the graphics system uses a second internal representation for the object's geometry.

43. The computer system of claim 42, wherein the first internal representation for the object's geometry is different than the second internal representation for the object's geometry.

44. The computer system of claim 43, further comprising means for making a tentative change to the geometry system's representation of the object's geometry or to the graphic system's representation of the object's geometry;

means for making permanent the tentative change when the tentative change is committed; and means for detecting an inconsistency between the geometry system's representation of the object's geometry and the graphic system's representation of the object's geometry.

45. The computer system of claim 44, further comprising means for resolving the inconsistency.

46. The computer system of claim 42, wherein the geometry system's representation of the object's geometry is empty.

47. The computer system of claim 46, wherein the object comprises text.

48. The computer system of claim 46, wherein the object comprises a three-dimensional symbol.

49. The computer system of claim 42, wherein aggregating comprises means for representing non-manifold geometries.

50. The computer system of claim 41, wherein the geometry system uses a first internal representation for an object's property and the graphics system uses a second internal representation for the object's property.

51. The computer system of claim 50, wherein the first internal representation for the object's property is different than the second internal representation for the object's property.

52. The computer system of claim 51, further comprising means for making a tentative change to the geometry system's representation of the object's property or to the graphic system's representation of the object's property;

means for making permanent the tentative change when the tentative change is committed; and means for detecting an inconsistency between the geometry system's representation of the object's property and the graphic system's representation of the object's property.

53. The computer system of claim 52, further comprising means for resolving the inconsistency.

54. The computer system of claim 34, further comprising means for customizing the interface.

55. The computer system of claim 54, further comprising means for extending the interface.

56. The computer system of claim 34, further comprising means for classifying a surface into a volume.

57. The computer system of claim 34, wherein aggregating comprises means for distributing the functionality of the geometry system and the functionality of the graphics system.

58. The computer system of claim 57, wherein distributing comprises means for executing the functionality of the geometry system on a first processor; and means for executing the functionality of the graphics system on a second processor.

59. The computer system of claim 34, further comprising means for providing mapping between a property in the geometry system and a renderable attribute in the graphics system.

60. A computer system for interactively constructing, editing, rendering and manipulating geoscience models comprising a graphics system and a geometry system;

means for providing the functionality of the geometry system by a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

means for providing the functionality of the graphics system by a graphics hierarchy of classes, wherein the graphics system functionality includes rendering a model, and wherein objects in the graphics system are connected to one another in a scene graph; and means for enforcing consistency between a geometry system and a graphics system.

61. The computer system of claim 60, wherein enforcing consistency comprises means for allowing inconsistency when an application makes a change to an object in one of the hierarchies.

62. The computer system of claim 61, wherein enforcing consistency further comprises means for resolving the inconsistency when the application commits to the change.

63. The computer system of claim 60, wherein enforcing consistency comprises means for allowing inconsistency when an application initiates a change to both of the systems and one of the systems is faster at making the change than the other system.

64. The computer system of claim 63, further comprising means for resolving the inconsistency when the other system completes the change.

65. A computer system for interactively constructing, editing, rendering and manipulating geoscience models comprising a geometry system having a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

a graphics system having a graphics hierarchy of classes, wherein the graphics system functionality includes rendering a model, and wherein objects in the graphics system are connected to one another in a scene graph; and means for interfacing a geometry system and a graphics system to an application through an integration layer having an aggregation of the geometry hierarchy of classes and the graphics hierarchy of classes.

66. The computer system of claim 65, further comprising means for selectively bypassing the integration layer.

67. The computer system of claim 65, wherein the integration layer does not completely encapsulate the geometry system and the graphics system.

68. A computer program, residing on a computer programmable medium, for interactively constructing, editing, rendering and manipulating geoscience models comprising instructions for causing the computer to provide the functionality of the geometry system by a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

provide the functionality of the graphics system by a graphics hierarchy of classes, wherein the graphics system functionality includes rendering a model, and wherein objects in the graphics system are connected to one another in a scene graph; and aggregate the functionality of a geometry system and a graphics system by providing the functionality of an aggregate hierarchy of classes, the aggregate hierarchy of classes connecting to the geometry hierarchy of classes and to the graphics hierarchy of classes.

69. The computer program of claim 68, wherein the geometry system is separate from the graphics system.

70. The computer program of claim 68, wherein the instructions for causing the computer to aggregate comprise instructions for causing the computer to provide the functionality of two or more objects.

71. The computer program of claim 70, wherein the geometry system uses a first internal representation for an object's geometry and the graphics system uses a second internal representation for the object's geometry.

72. The computer program of claim 71, wherein the first internal representation for the object's geometry is different than the second internal representation for the object's geometry.

73. The computer program of claim 72, further comprising instructions for causing the computer to
make a tentative change to the geometry system's representation of the object's geometry or to the graphic system's representation of the object's geometry;
make permanent the tentative change when the tentative change is committed; and
detect an inconsistency between the geometry system's representation of the object's geometry and the graphic system's representation of the object's geometry.

74. The computer program of claim 73, further comprising instructions for causing the computer to resolve the inconsistency.

75. The computer program of claim 71, wherein the geometry system's representation of the object's geometry is empty.

76. The computer program of claim 75, wherein the object comprises text.

77. The computer program of claim 75, wherein the object comprises a three-dimensional symbol.

78. The computer program of claim 71, wherein aggregating comprises instructions for causing the computer to represent non-manifold geometries.

79. The computer program of claim 70, wherein the geometry system uses a first internal representation for an object's property and the graphics system uses a second internal representation for the object's property.

80. The computer program of claim 79, wherein the first internal representation for the object's property is different than the second internal representation for the object's property.

81. The computer program of claim 80, further comprising instructions for causing the computer to
make tentative change to the geometry system's representation of the object's property or to the graphic system's representation of the object's property;
make permanent the tentative change when the tentative change is committed; and
detect an inconsistency between the geometry system's representation of the object's property and the graphic system's representation of the object's property.

82. The computer program of claim 81, further comprising instructions for causing the computer to resolve the inconsistency.

83. The computer program of claim 68, further comprising instructions for causing the computer to provide an interface to the aggregated geometry system and graphics system.

84. The computer program of claim 83, further comprising instructions for causing the computer to customize the interface.

85. The computer program of claim 84, further comprising instructions for causing the computer to extend the interface.

86. The computer program of claim 68, further comprising instructions for causing the computer to
classify a surface into a volume.

87. The computer program of claim 68, wherein aggregating comprises instructions for causing the computer to
distribute the functionality of the geometry system and the functionality of the graphics system.

88. The computer program of claim 87, wherein the instructions for causing the computer to distribute comprise instructions for causing the computer to execute the functionality of the geometry system on a first processor; and
execute the functionality of the graphics system on a second processor.

89. The computer program of claim 68, further comprising instructions for causing the computer to
provide mapping between a property in the geometry system and a renderable attribute in the graphics system.

90. The computer program of claim 68, wherein the instructions for causing the computer to provide the functionality of the geometry system comprise instructions for causing the computer to provide an editing capability.

91. The computer program of claim 90, wherein the instructions for causing the computer to edit comprise instructions for causing the computer to localize an edit.

92. The computer program of claim 68, wherein an object, not a part of the geometry system, is part of the graphics system.

93. A computer program for interactively constructing, editing, rendering and manipulating geoscience models comprising instructions for causing the computer to
provide the functionality of a geometry system by a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;
provide the functionality of a graphics system by a graphics hierarchy of classes, wherein the graphics system functionality includes rendering a model, and wherein objects in the graphics system are connected to one another in a scene graph; and
enforce consistency between the geometry system and the graphics system.

94. The computer program of claim 93, wherein the instructions for causing the computer to enforce consistency comprise instructions for causing the computer to
represent geoscience features as objects in both the geometry hierarchy and in the graphics hierarchy; and
allow inconsistency between corresponding objects in the geometry hierarchy and the graphics hierarchy when an application makes a change to one of the systems.

95. The computer program of claim 94, wherein the instructions for causing the computer to enforce consistency further comprise instructions for causing the computer to resolve the inconsistency when the application commits to the change.

96. The computer program of claim 93, wherein the instructions for causing the computer to enforce consistency comprise instructions for causing the computer to allow inconsistency when an application initiates a change to both of the systems and one of the systems is faster at making the change than the other system.

97. The computer program of claim 96, further comprising instructions for causing the computer to resolve the inconsistency when the other system completes the change.

98. A computer program for interactively constructing, editing, rendering and manipulating geoscience models comprising instructions for causing the computer to provide a geometry hierarchy of classes, wherein the geometry system functionality provides support for at least one geometric operation selected from the set curve-to-curve intersection, surface-to-surface intersection, surface-to-curve intersection, solid object union, solid object intersection, solid object subtraction, and wherein objects in the geometry system are connected to one another topologically;

provide a graphics hierarchy of classes, wherein the graphics system functionality includes rendering a model, and wherein objects in the graphics system are connected to one another in a scene graph; and interface a geometry system and a graphics system to an application through an integration layer by providing an aggregation of the geometry hierarchy of classes and the graphics hierarchy of classes.

99. The computer program of claim 98, further comprising instructions for causing the computer to selectively bypass the integration layer.

100. The computer program of claim 98, wherein the integration layer does not completely encapsulate the geometry system and the graphics system.

* * * * *